United States Patent
Hamada et al.

(10) Patent No.: US 9,291,982 B2
(45) Date of Patent: Mar. 22, 2016

(54) DRIVING TRANSMISSION DEVICE AND IMAGE FORMING APPARATUS

(71) Applicant: CANON KABUSHIKI KAISHA, Tokyo (JP)

(72) Inventors: Shuhei Hamada, Yokohama (JP); Yuri Mori, Tokyo (JP); Kota Kiyama, Kawasaki (JP); Toru Miyazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/667,526

(22) Filed: Mar. 24, 2015

(65) Prior Publication Data
US 2015/0277338 A1    Oct. 1, 2015

(30) Foreign Application Priority Data

Mar. 28, 2014  (JP) ................ 2014-068639

(51) Int. Cl.
| | | |
|---|---|---|
| *G03G 15/00* | (2006.01) | |
| *F16H 7/02* | (2006.01) | |
| *F16H 55/38* | (2006.01) | |

(52) U.S. Cl.
CPC .............. *G03G 15/757* (2013.01); *F16H 7/02* (2013.01); *F16H 55/38* (2013.01)

(58) Field of Classification Search
CPC .......... G03G 15/757; F61H 7/02; F61H 55/38
USPC ....................................................... 399/167
See application file for complete search history.

(56) References Cited

U.S. PATENT DOCUMENTS

| | | | | |
|---|---|---|---|---|
| 4,571,220 | A * | 2/1986 | Nakano ................ | F16H 55/38 474/100 |
| 5,411,444 | A * | 5/1995 | Nakamura ............. | F16H 7/02 474/148 |
| 5,884,133 | A * | 3/1999 | Morimoto .......... | G03G 15/167 399/121 |
| 6,925,279 | B2 * | 8/2005 | Kamoshita ........ | G03G 15/0131 399/167 |
| 2004/0265004 | A1 * | 12/2004 | Monahan ............ | G03G 15/757 399/167 |
| 2005/0085945 | A1 * | 4/2005 | Andoh ................. | G03G 15/757 700/230 |
| 2015/0147093 | A1 * | 5/2015 | Mori ....................... | F16H 55/38 399/167 |
| 2015/0277339 | A1 * | 10/2015 | Miyazawa ........... | G03G 15/757 399/167 |

FOREIGN PATENT DOCUMENTS

JP    H08-146783 A    6/1996

* cited by examiner

*Primary Examiner* — Susan Lee
(74) *Attorney, Agent, or Firm* — Canon U.S.A., Inc. IP Division

(57) ABSTRACT

A driving transmission device includes a motor, a first pulley to be rotated by the motor, a second pulley connected to a rotating member, an endless belt wound on the first pulley and the second pulley, a dielectric layer provided between the endless belt and the first pulley and between the endless belt and the second pulley, and a power supply unit configured to apply a voltage to the first pulley. The first pulley, the endless belt, and the second pulley are connected in series. A length by which the endless belt is wound on the second pulley is larger than a length by which the endless belt is wound on the first pulley. A voltage applied to the second pulley is lower than the voltage applied to the first pulley.

18 Claims, 9 Drawing Sheets

DRIVING TRANSMISSION DEVICE AND IMAGE FORMING APPARATUS

BACKGROUND OF THE INVENTION

1. Field of the Invention

The present invention relates to a driving transmission device in which rotation force of a driving source is transmitted to a driven portion by a belt wound around a driving pulley and a driven pulley, and an image forming apparatus including the driving transmission device.

2. Description of the Related Art

In various known apparatuses including image forming apparatuses such as a copying machine and a printer, a driving transmission device is provided to transmit rotation force of a driving source, such as a motor, to a driven portion.

For example, an image forming apparatus adopts a structure in which driving force of a motor serving as a driving source is transmitted via gears to a driving roller for driving a photoconductive drum and an intermediate transfer belt serving as driven portions. In this structure, however, a rotation transmission error (for example, a mesh transmission error) between a driving gear and a driven gear becomes a vibromotive force and causes vibration. The caused vibration is transmitted to gear support members, such as a shaft, a bearing, and a side plate, and driven components, and this may cause loud noise. When vibration occurs in the image forming apparatus, a striped image or an image having uneven density may be formed, and image degradation, such as streaks and unevenness, may be caused.

Accordingly, there is a driving transmission device in which a belt is wound around a pulley connected to a driving source and a pulley connected to a driven portion. In this driving transmission device, the pulleys and the belt are electrostatically attracted, and transmit driving force of the driving source to the driven portion. For example, in an image forming apparatus described in Japanese Patent Laid-Open No. 8-146783, a driving roller drives an intermediate transfer belt. In this image forming apparatus, electrostatic attraction force is exerted between the driving roller and the intermediate transfer belt by applying a bias to a core metal of the driving roller, so that the driving force of the driving roller is transmitted to the intermediate transfer belt.

When voltage is applied to a conductive portion of a belt and a conductive portion of a pulley to generate an electrostatic force (Johnsen-Rahbek force), current flows through a dielectric layer interposed between the conductive portions, and generates Joule heat.

The length by which the belt is wound on the pulley (winding length) is inversely proportional to the electric resistance value. That is, the resistance value between the pulley and the belt decreases as the area in which the pulley is in contact with the belt increases. For example, the area in which a pulley having a long belt winding length is in contact with the belt with the dielectric layer being disposed between is larger than that of a pulley having a short winding length. For this reason, the total resistance value between the conductive portion of the pulley and the conductive portion of the belt is smaller in the pulley having the long winding length.

For example, when the length by which the belt is wound on the driving pulley is larger than the length by which the belt is wound on the driven pulley, the resistance value between the driving pulley and the belt is larger than the resistance value between the driven pulley and the belt.

In a structure in which the driving pulley, the belt, and the driven pulley are electrically connected in series and the pulleys are attracted to the belt by electrostatic force, the voltage applied to the driving pulley is higher than the voltage applied to the driven pulley owing to the difference in resistance value.

Thus, the attraction force between the driving pulley and the belt is larger than the attraction force between the driven pulley and the belt. For this reason, a slip occurs between the driven pulley and the belt. Therefore, when the driving force is transmitted from the driving pulley to the driven pulley via the belt, it is necessary to set the voltage supplied from a power supply so that a slip does not occur between the driven pulley and the belt.

Since the voltage is applied between the conductive portion of the belt and the conductive portions of the pulleys, the current flowing through the driving pulley and the current flowing through the driven pulley are equal to each other.

SUMMARY OF THE INVENTION

The present invention suppresses a slip of a belt by applying a proper voltage to a driving pulley and a driven pulley in a structure in which the driving pulley, the belt, and the driven pulley are electrically connected in series.

A driving transmission device according to an aspect of the present invention includes a motor, a first pulley to be rotated by the motor, a second pulley connected to a rotating member, an endless belt wound on the first pulley and the second pulley, a dielectric layer provided between the endless belt and the first pulley and between the endless belt and the second pulley, and a power supply unit configured to apply a voltage to the first pulley. The first pulley, the endless belt, and the second pulley are connected in series. A length by which the endless belt is wound on the second pulley is larger than a length by which the endless belt is wound on the first pulley. A voltage applied to the second pulley is lower than the voltage applied to the first pulley.

Further features of the present invention will become apparent from the following description of exemplary embodiments with reference to the attached drawings.

DESCRIPTION OF THE EMBODIMENTS

Embodiments of the present invention will be described below with reference to the drawings.

It is noted that members, numeric values, materials, and so on used in the following description are merely exemplary to facilitate understanding, and are not intended to limit the present invention.

First Embodiment

Figure 1:
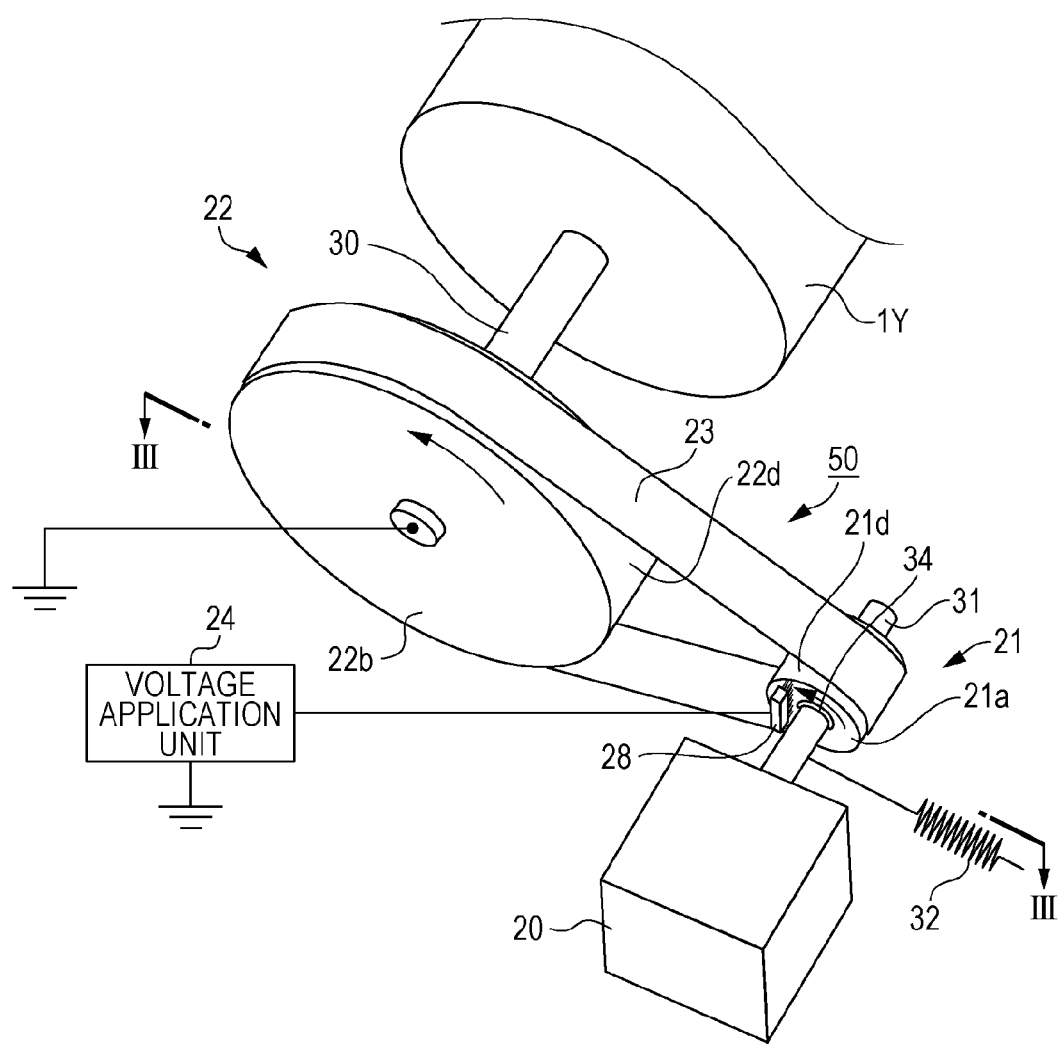
FIG. 1 is a perspective view of a driving transmission device according to a first embodiment.

FIG. 1 is a perspective view of a driving transmission device provided in an image forming apparatus serving as an electrophotographic printer.

Basic configuration and behavior of the image forming apparatus will be described with reference to FIG. 2.

Figure 2:
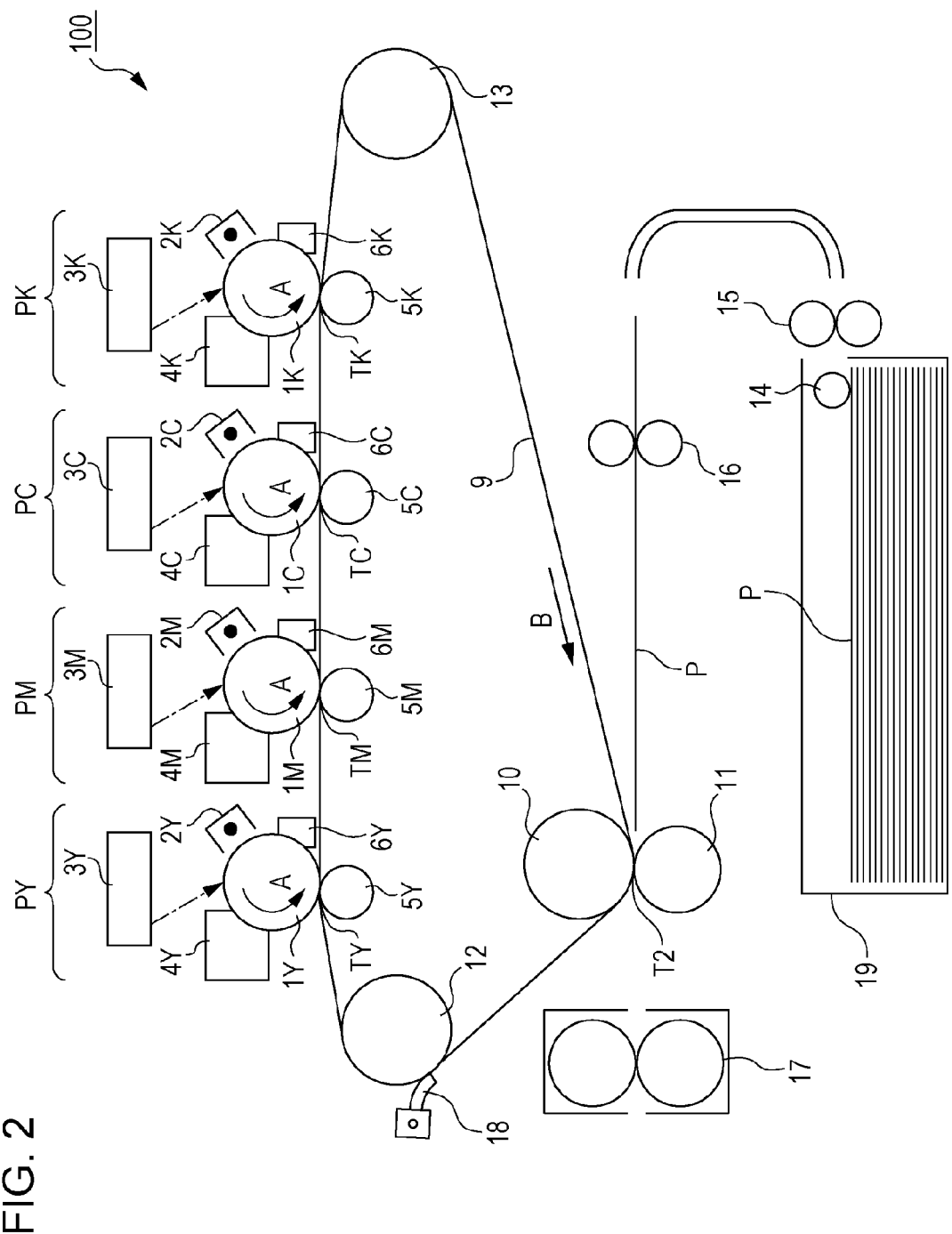
FIG. 2 is a schematic cross-sectional view of an image forming apparatus.

An image forming apparatus 100 illustrated in FIG. 2 is a full-color laser beam printer in which yellow, magenta, cyan, and black image forming units PY, PM, PC, and PK are arranged along an intermediate transfer belt 9.

The image forming unit PY forms a yellow toner image on a photoconductive drum 1Y to be rotated. The yellow toner image born on the photoconductive drum 1Y is conveyed by rotation of the photoconductive drum 1Y. The image forming unit PY includes an unillustrated power supply unit, and a primary transfer roller 5Y to which voltage is to be applied from the power supply unit. The yellow toner image on the photoconductive drum 1Y is transferred onto the intermediate transfer belt 9 by applying voltage from the power supply unit to the primary transfer roller 5Y at a primary transfer portion TY where the photoconductive drum 1Y and the primary transfer roller 5Y nip the intermediate transfer belt 9. Similarly, the image forming units PM, PC, and PK form a magenta toner image, a cyan toner image, and a black toner image on photoconductive drums 1M, 1C, and 1K, respectively. The color toner images are transferred onto the intermediate transfer belt 9 by primary transfer rollers 5M, 5C, and 5K at primary transfer portions TM, TC, and TK. By transferring and superimposing the color toner images on the intermediate transfer belt 9, a full-color toner image is born on the intermediate transfer belt 9.

The intermediate transfer belt 9 is supported while being wound around a driving roller 13, a tension roller 12, and a backup roller 10, and rotates in a direction of arrow B in FIG. 2 with rotation of the driving roller 13. The intermediate transfer belt 9 is stretched upward in FIG. 2 by the primary transfer rollers 5Y to 5K, and forms the primary transfer portions TY to TK between the intermediate transfer belt 9 and the photoconductive drums 1Y to 1K.

The image forming apparatus 100 further includes an unillustrated power supply unit, and a secondary transfer roller 11 to which voltage is applied from the power supply unit. A toner image born on the intermediate transfer belt 9 is conveyed to a secondary transfer portion T2 with rotation of the intermediate transfer belt 9, and is transferred onto a recording medium P by the application of voltage from the power supply unit to the secondary transfer roller 11. Toner that is not transferred, but remains on the intermediate transfer belt 9 is removed by a cleaning blade 18 in contact with the intermediate transfer belt 9, and the intermediate transfer belt 9 is used for the next image forming operation.

Recording media P are drawn out from a sheet cassette 19 by a sheet feed roller 14, are separated one by one by a separation unit 15, and are fed out to registration rollers 16.

The registration rollers 16 feed a separated recording medium P to the secondary transfer portion T2 so that a leading edge of the recording medium P matches the toner image born on the intermediate transfer belt 9. After the toner image is secondary-transferred on the recording medium P, the recording medium P is delivered to a fixing device 17, and is heated and pressed to fix the toner image on a surface of the recording medium P.

Around each of the photoconductive drums 1 (1Y, 1M, 1C, 1K), a charging device 2 (2Y, 2M, 2C, 2K), an exposure device 3 (3Y, 3M, 3C, 3K), and a developing device 4 (4Y, 4M, 4C, 4K) are arranged. Further, the primary transfer roller 5 (5Y, 5M, 5C, 5K) and a cleaning device 6 (6Y, 6M, 6C, 6K) are arranged.

The image forming units PY, PM, PC, and PK are similarly configured except that toners contained in the developing devices 4Y, 4M, 4C, and 4K are different in color. Therefore, the yellow image forming unit PY will be described below, and descriptions of the image forming units PM, PC, and PK are skipped.

In the photoconductive drum 1Y, an outer peripheral surface of an aluminum cylinder is coated with an organic photoconductive layer of a negative charging polarity to form a photoconductive layer. The photoconductive drum 1Y rotates in a direction of arrow A. The charging device 2Y receives negative voltage, and irradiates the surface of the photoconductive drum 1Y with charging particles to charge the surface of the photoconductive drum 1Y with uniform negative potential. The exposure device 3Y controls a laser beam on the basis of yellow image data. The exposure device 3Y exposes the photoconductive drum 1Y by deflecting the laser beam with a rotary mirror so that the laser beam scans the photoconductive drum 1Y. Thus, an electrostatic latent image corresponding to the image data is formed on the charged surface of the photoconductive drum 1Y.

The developing device 4Y agitates two-component developer containing toner and magnetic carriers, and negatively charges the toner. The charged toner is born around fixed magnetic poles on a developing sleeve that rotates in a direction opposite from the direction of the photoconductive drum 1Y, and frictionally slides on the photoconductive drum 1Y. In the developing device 4Y, a developing voltage obtained by superimposing an alternating-current voltage on a negative direct-current voltage is applied to the developing sleeve, and the toner is attached to the electrostatic latent image on the photoconductive drum 1Y that is positive relative to the developing sleeve to develop the electrostatic latent image into a toner image.

The primary transfer roller 5Y nips the intermediate transfer belt 9 between the primary transfer roller 5Y and the photoconductive drum 1Y, and forms the primary transfer portion TY between the photoconductive drum 1Y and the intermediate transfer belt 9. The power supply unit applies a positive direct-current voltage to the primary transfer roller 5Y. The toner born on the photoconductive drum 1Y is negatively charged. For this reason, a toner image on the photoconductive drum 1Y is transferred onto the intermediate transfer belt 9 by the application of the positive direct-current voltage from the power supply unit via the primary transfer roller 5Y. The cleaning device 6Y removes transfer residual toner, which passes through the primary transfer portion TY and remains on the surface of the photoconductive drum 1Y, by frictionally sliding the cleaning blade on the photoconductive drum 1Y.

The secondary transfer roller 11 is pressed against the backup roller 10 with the intermediate transfer belt 9 being disposed therebetween to form the secondary transfer portion T2 between the intermediate transfer belt 9 and the secondary transfer roller 11. In the secondary transfer portion T2, the recording medium P is nipped and conveyed. While the recording medium P is passing through the secondary transfer portion T2, the toner image is secondary-transferred from the intermediate transfer belt 9 onto the recording medium P.

A positive direct-current voltage is applied to the secondary transfer roller 11, and a transfer current flows through a series circuit formed by the backup roller 10, the intermediate transfer belt 9, the recording medium P, and the secondary transfer roller 11. The transfer current participates in movement of the toner from the intermediate transfer belt 9 to the recording medium P.

While the image forming apparatus 100 includes four image forming units in the above description, for example, it may include only an image forming unit that forms a black toner image.

Next, the structure of a driving transmission device 50 will be described with reference to FIGS. 1, 3, and 4. The driving transmission device 50 increases a transmittable driving force by electrostatically attracting pulleys and a belt to each other by utilizing the electrostatic attraction force (Johnsen-Rahbek force).

The photoconductive drum 1Y is given as an example of a driven portion to be rotated by rotational driving force transmitted from a driving source, and a motor 20 is given as an example of the driving source.

When the driving transmission device 50 is applied to the image forming apparatus 100, a component that rotates to perform operation related to image formation is suitable as an example of the driven portion. Besides the intermediate transfer belt 1, for example, the driving roller 13 for driving the intermediate transfer belt 9 or a fixing roller in the fixing device 17 is suitable. However, the driven portion is not limited to these components.

As illustrated in FIG. 1, the driving transmission device 50 includes a driving pulley 21, a driven pulley 22, and an endless belt 23. Rotational driving force of a motor 20 is transmitted to the photoconductive drum 1Y via the driving pulley 21, the belt 23, and the driven pulley 22. The belt 23 is wound on the driving pulley 21 and the driven pulley 22. Power transmission is performed by frictional forces between the belt 23 and the pulleys 21 and 22.

The driving force generated by the motor 20 is transmitted to the driving pulley 21 via an output shaft 31. When the driving pulley 21 is rotated by receiving the driving force, the driving force is transmitted to the belt 23 by a frictional force on a contact surface between the driving pulley 21 and the belt 23. When the belt 23 rotates with the transmitted driving force, the driving force is transmitted to the driven pulley 22 by a frictional force on a contact surface between the belt 23 and the driven pulley 22. Since the driven pulley 22 and the photoconductive drum 1Y are connected by a rotation shaft 30, the driving force of the driven pulley 22 is transmitted to the photoconductive drum 1Y.

While the belt 23 is, for example, a flat belt, it may be a V-belt or a V-ribbed belt.

Figure 3:
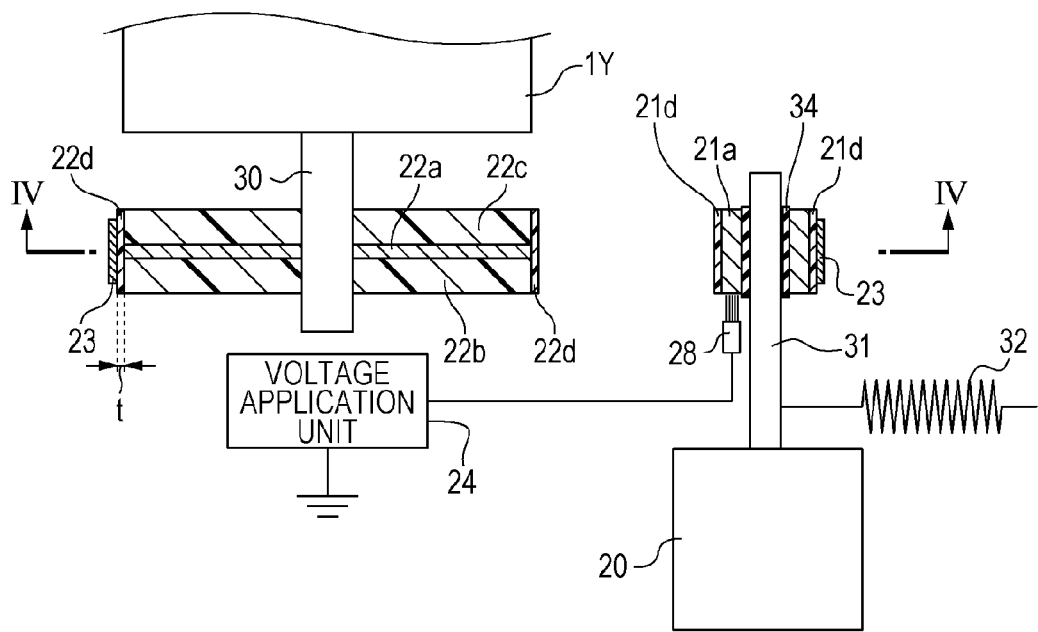
FIG. 3 is a cross-sectional view taken along line III-III of FIG. 1.

FIG. 3 is a cross-sectional view taken along line III-III of FIG. 1. FIG. 4 is a cross-sectional view taken along line IV-IV of FIG. 3, and schematically illustrates the voltage applied from a voltage application unit 24.

Figure 4:
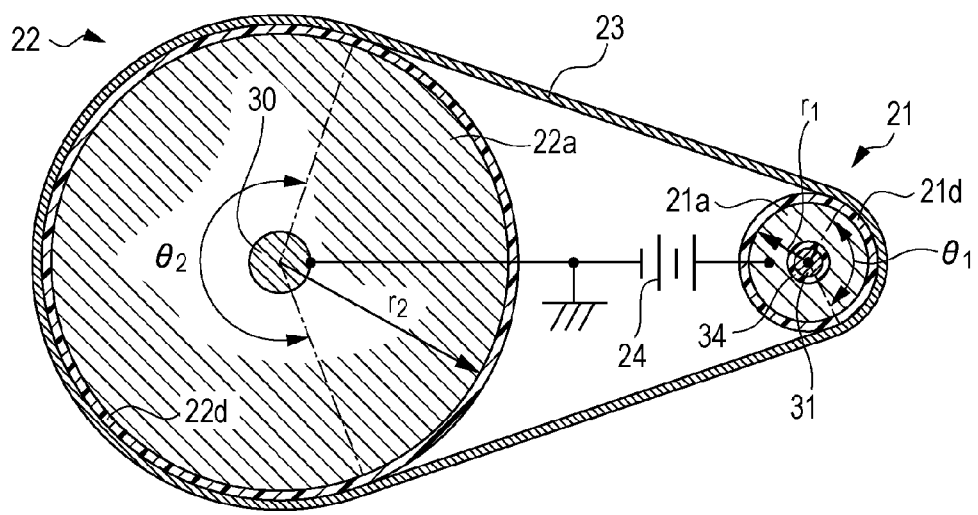
FIG. 4 is a cross-sectional view taken along line IV-IV of FIG. 3.

As illustrated in FIG. 4, the driving pulley 21 has a radius $r_1$ of 10 mm and a width of about 12 mm. A winding angle $\theta_1$ of the belt 23 on the driving pulley 21 is 150 degrees. The driven pulley 22 has a radius $r_2$ of about 40 mm and a width of about 12 mm. A winding angle $\theta_2$ of the belt 23 on the driven pulley 22 is 210 degrees. The diameter of the driven pulley 22 is larger than the diameter of the driving pulley 21. For this reason, in the driving transmission device 50, the rotation speed of the driven pulley 22 is lower than the rotation speed of the driving pulley 21.

A winding length of a region where the belt 23 is wound on the pulley in the rotating direction of the pulley (a region where the belt 23 is in contact with the pulley) (hereinafter also simply referred to as "belt winding length") can be calculated from the radius of the pulley and the winding angle. The winding length on the driving pulley 21 is about 26.2 mm, and the winding length on the driven pulley 22 is about 146.6 mm.

The driving pulley 21 connected to the output shaft 31 of the motor 20 has a cylindrical metal portion 21a and a dielectric layer 21d provided on a side of the metal portion 21a in contact with the belt 23 (outer peripheral surface). The dielectric layer 21d is formed of a polyimide resin material having a volume resistivity of $10^{11}$ Ω·cm, and has a thickness (film thickness) of about 70 μm and a width of about 12 mm that is similar to the width of the metal portion 21a. The metal portion 21a serving as a conductive portion functions as an electrode in the driving pulley 21.

A direct-current voltage is applied from the voltage application unit 24 to the driving pulley 21 via a conductive brush 28. A connecting portion between the driving pulley 21 and the output shaft 31 is insulated by an insulating member 34. A tension spring 32 is attached to the output shaft 31 of the motor 20, and pulls the output shaft 31 to apply tensile force to the belt 23.

The driven pulley 22 includes a metal portion 22a, two resin portions 22b and 22c, and a dielectric layer 22d. The metal portion 22a is shaped like a disc, and has a radius of about 40 mm and a width of about 2 mm. The metal portion 22a of the driven pulley 22 is electrically grounded (GND) via the rotation shaft 30. For example, a brush is in contact with the rotation shaft 30, and the brush is electrically grounded.

The resin portions 22b and 22c are each shaped like a disc, and have a radius of about 40 mm and a width of about 5 mm. As illustrated in FIG. 3, the metal portion 22a is provided between the two resin portions 22b and 22c, and the dielectric layer 22d is provided on outer peripheries of these portions to constitute the driven pulley 22 having a width of 12 mm. The metal portion 22a serving as a conductive portion functions as an electrode in the driven pulley 22.

Similarly to the dielectric layer 21d of the driving pulley 21, the dielectric layer 22d is formed of a polyimide resin material having a volume resistivity of $10^{11}$ Ω·cm, and has a thickness (film thickness) of about 70 μm and a width of about 12 mm. The distance between the rotation centers of the driven pulley 22 and the driving pulley 21 is 100 mm.

The belt 23 is formed of a conductive metal such as stainless steel, and has a thickness of about 50 μm. The width of the belt 23 is about 10 mm, and is smaller than the width of the dielectric layers 21d and 22d, as illustrated in FIG. 3. Electric discharge is prevented by ensuring a long creepage distance between the metal portions 21a and 22a of the pulleys 21 and 22 and the belt 23. The belt 23 may have a double-layer structure in which, for example, a conductive metal layer is formed on an elastic layer by sputtering of Ni.

Next, an electric connection structure will be described.

The driving transmission device 50 includes the voltage application unit 24 serving as one direct-current high-voltage power supply to apply voltage to the pulleys 21 and 22. The voltage application unit 24 applies a voltage of 850 V to the metal portion 21a of the driving pulley 21 via a conductive brush (not illustrated). In contrast, the metal portion 22a of the driven pulley 22 is grounded, as described above. Therefore, the metal portion 21a and the dielectric layer 21d of the driving pulley 21, the belt 23, the dielectric layer 22d and the metal portion 22a of the driven pulley 22 are electrically connected in series in this order.

In this series circuit, a potential difference is given between the driving pulley 21 and the driven pulley 22 by the application of the voltage from the voltage application unit 24. Then, electrostatic attraction forces (Johnsen-Rahbek forces) are generated between the metal portion 21a of the driving pulley 21 and the belt 23 and between the metal portion 22a of the driven pulley 22 and the belt 23, and the pulleys are electrically attracted to the belt 23. As a result of this occurrence of electrostatic attraction forces, normal forces d increase and frictional forces increase between the belt 23 and the driving pulley 21 and between the belt 23 and the driven pulley 22. Hence, the driving force that can be transmitted by the driving transmission device 50 is increased.

Next, the electrostatic attraction force (Johnsen-Rahbek force) will be described.

Figure 5:
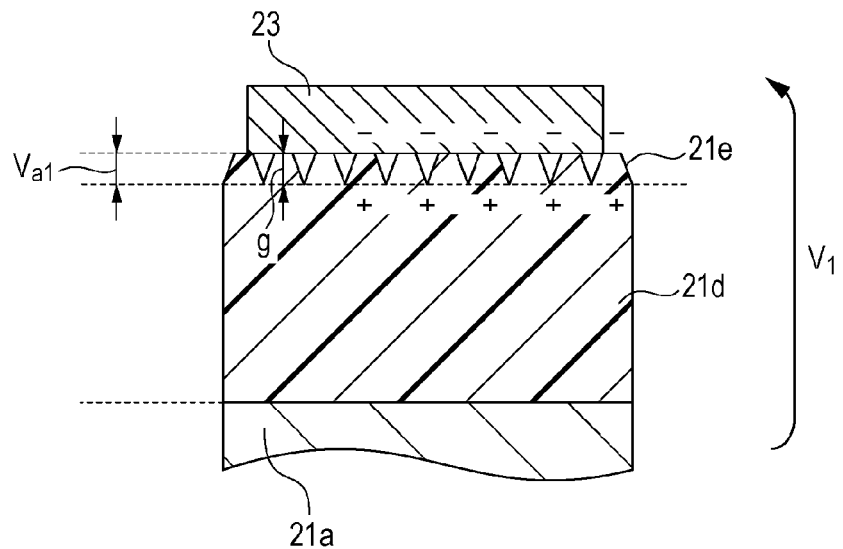
FIG. 5 is a schematic cross-sectional view of an outer peripheral portion of a driving pulley.
Figure 6:
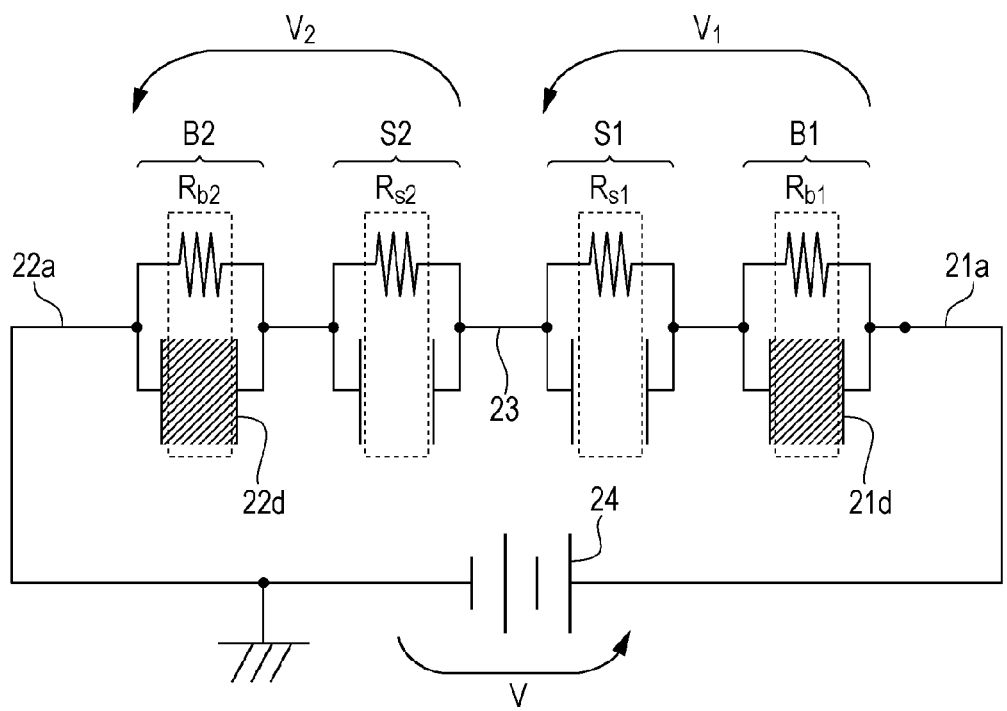
FIG. 6 illustrates an equivalent circuit showing electric properties of the driving transmission device.

FIG. 5 is a schematic cross-sectional view of the outer peripheral portion of the driving pulley 21, and illustrates the relationship among the metal portion 21a, the dielectric layer 21d, and the belt 23. FIG. 6 illustrates an equivalent circuit showing electric properties of the driving transmission device 50.

A contact surface (contact interface) between the belt 23 and the dielectric layer 21d has contact portions and non-contact portions, when viewed microscopically. FIG. 5 conceptually illustrates a state of the contact surface. When voltage is applied to the metal portion 21a of the driving pulley 21, current flows through the contact portions between a surface 21e of the dielectric layer 21d and the belt 23, and a great voltage drop is locally caused by the contact resistance across the contact points between the surface 21e and the belt 23. This voltage drop is designated as $V_{a1}$.

Then, as illustrated in FIG. 5, positive and negative charges are induced on faces of the contact points between the surface 21e of the dielectric layer 21d and the belt 23 that are opposed to each other with a small gap g therebetween, a pronouncedly great electric field is generated in the small gap g, and a great attraction force is generated by the induced positive and negative charges. This attraction force is called a Johnsen-Rahbek force. In general, the Johnsen-Rahbek force becomes a great force when the volume resistivity of the dielectric material is higher than or equal to $1 \times 10^9$ Ω·cm and less than $1 \times 10^{14}$ Ω·cm.

As illustrated in FIG. 6, since the Johnsen-Rahbek force is electrostatic attraction force at the contact portions, the electric resistance can be separated into the resistance in a contact portion and the resistance in a dielectric bulk portion between the pulleys 21 and 22 and the belt 23. A dielectric bulk portion B1 and a contact portion S1 are provided between the metal portion 21a of the driving pulley 21 and the belt 23. In contrast, a dielectric bulk portion B2 and a contact portion S2 are provided between the metal portion 22a of the driven pulley 22 and the belt 23. The contact portions S1 and S2 and the dielectric bulk portions B1 and B2 can be expressed by parallel connections of resistor components and capacitor components.

First, a case in which the transmittable driving force necessary in the driving transmission device 50 is 2.5 kgf is given as an example, and the voltages applied to the driving pulley 21 and the driven pulley 22 when a voltage of 850 V is applied from the voltage application unit 24 will be considered.

As illustrated in FIG. 6, the electric resistance between each of the pulleys 21 and 22 and the belt 23 can be separated into a contact resistance in the contact portion S and a resistance at the dielectric bulk portion B. When $V_1$ represents the potential difference between the metal portion 21a of the driving pulley 21 and the belt 23 and $V_2$ represents the potential difference between the metal portion 22a of the driven pulley 22 and the belt 23, the potential differences $V_1$ and $V_2$ are given by the following Expressions 1 and 2:

$$V_1 = \frac{R_{s1} + R_{b1}}{R_{s1} + R_{b1} + R_{s2} + R_{b2}} V \quad (1)$$

$$V_2 = \frac{R_{s2} + R_{b2}}{R_{s1} + R_{b1} + R_{s2} + R_{b2}} V \quad (2)$$

where $R_{s1}$ represents the contact resistance between the dielectric layer 21d and the belt 23 (contact portion S1), $R_{b1}$ represents the bulk resistance of the dielectric layer 21d (dielectric bulk portion B1), $R_{S2}$ represents the contact resistance between the dielectric layer 22d and the belt 23 (contact portion S2), and $R_{b2}$ represents the bulk resistance of the dielectric layer 22d (dielectric bulk portion B2).

The Johnsen-Rahbek forces are generated by voltages acting on the contact portions S1 and S2, and these voltages are obtained from the partial pressures of the contact resistances $R_{S1}$ and $R_{S2}$ of the contact portions S1 and S2 and the bulk resistances $R_{b1}$ and $R_{b2}$ of the dielectric bulk portions B1 and B2. According to the voltages at the contact portions S1 and S2, Johnsen-Rahbek forces resulting from electric fields are generated in the capacitor components of the contact portions S1 and S2.

The ratio of the potential difference $V_1$ and the potential difference $V_2$ is determined by the ratio of a combined resistance ($R_{s1}+R_{b1}$) of the contact resistance and the bulk resistance between the driving pulley 21 and the belt 23 and a combined resistance ($R_{s2}+R_{b2}$) of the contact resistance and the bulk resistance between the driven pulley 22 and the belt 23. Since the dielectric layers 21d and 22d are equal in material and thickness, the ratio of the potential differences is determined by the ratio of the contact area between the driving pulley 21 and the belt 23 and the contact area between the driven pulley 22 and the belt 23.

The contact areas between the pulleys 21 and 22 and the belt 23 will be described by giving the driven pulley 22 as an example. The contact area between the driven pulley 22 and the belt 23 is determined by the contact width and belt winding length of the driven pulley 22 and the belt 23. The belt winding length can be found from the radius $r_2$ and the winding angle $\theta_2$ of the driven pulley 22. The contact width between the driven pulley 22 and the belt 23 will now be described.

When voltage is applied between the metal portion 22a of the driven pulley 22 and the belt 23, a microcurrent flows through the dielectric layer 22d between the metal portion 22a and the belt 23. At this time, the microcurrent flowing through the dielectric layer 22d does not spread within the dielectric layer 22d, but flows to the belt 23 while maintaining the same width as that of the metal portion 22a.

This shows that the substantial contact width between the driven pulley 22 and the belt 23, which has an electric influence, is the same as the width of the narrower one of the metal portion 22a and the belt 23, that is, the width of the metal portion 22a herein. That is, the width (opposed width) by which the metal portion 22a of the driven pulley 22 is opposed to the belt 23 serves as the substantial contact width.

As illustrated in FIG. 3, the width of the metal portion 22a of the driven pulley 22 is 2 mm, and this is smaller than the width of 10 mm of the belt 23. At this time, the substantial contact width is 2 mm. Therefore, the substantial contact area between the driven pulley 22 and the belt 23 is a value obtained by multiplying the width of 2 mm of the metal portion 22a by the winding length of 146.6 mm on the driven pulley 22, and the value is 293.2 mm².

This also applies to the driving pulley 21. Since the width of the metal portion 21a of the driving pulley 21 is 12 mm and the width of the belt 23 is 10 mm, the substantial contact width between the driving pulley 21 and the belt 23, which has an electric influence, is equal to the width of 10 mm of the belt 23. Therefore, the substantial contact area between the driving pulley 21 and the belt 23 is a value obtained by multiplying the width of 10 mm of the belt 23 by the winding length of 26.2 mm on the driving pulley 21, and the value is 262 mm².

The difference between the contact area between the driving pulley 21 and the belt 23 and the contact area between the driven pulley 22 and the belt 23 corresponds to the difference in the contact resistance value. The contact resistance value is nearly inversely proportional to the contact area. The voltages applied between the driving pulley 21 and the belt 23 and between the driven pulley 22 and the belt 23 are determined by the resistance values of the members connected in series. When a voltage of 850 V is applied from the voltage application unit 24, a voltage of about 450 V is applied as $V_1$ to the driving pulley 21, and a voltage of about 400 V is applied as $V_2$ to the driven pulley 22.

Since the width of the metal portion 22a of the driven pulley 22 is smaller than the width of the metal portion 21a of the driving pulley 21, the ratio of the voltages applied to the driving pulley 21 and the driven pulley 22 satisfies the following Expression 3:

$$L_2 \times V_2 > L_1 \times V_1 \qquad (3)$$

where $L_1$ represents the belt winding length on the first pulley (herein driving pulley 21), and $L_2$ represents the belt winding length on the second pulley (herein driven pulley 22). Since $L_1$=26.2 mm, $L_2$=146.6 mm, $V_1$=450 V, and $V_2$=400 V, Expression 3 is satisfied.

In contrast, a description will be given of a case in which the width of the metal portion 22a of the driven pulley 22 is equal to the width of 12 mm of the metal portion 21a of the driving pulley 21 without reflecting the devices of the present invention. In this case, the opposed widths of the metal portion 21a and the metal portion 22a to the belt 23 are both 10 mm.

Since the driving transmission force on the driven pulley 22 is small in this setting, it is necessary to set such an applied voltage that the largest possible transmittable driving force of the driven pulley 22 becomes 2.5 kgf. If the largest possible transmittable driving force of the driven pulley 22 is smaller than 2.5 kgf, the belt 23 slips, and the driven pulley 22 does not stably rotate. When a voltage of about 175 V is applied to the driven pulley 22, a driving force of 2.5 kgf can be ensured on the side of the driven pulley 22. At this time, a voltage of about 1030 V is applied to the driving pulley 21. Thus, the voltage application unit 24 applies an excessive voltage to the driving pulley 21.

In this case, since $L_1$=26.2 mm, $L_2$=146.6 mm, $V_1$=1030 V, and $V_2$=175 V, Expression 3 is not satisfied, and $L_1 \times V_1$ is substantially equal to $L_2 \times V_2$. Thus, the following Expression 4 is satisfied:

$$L_2 \times V_2 \approx L_1 \times V_1 \qquad (4)$$

When Expression 4 is nearly satisfied, the driving pulley 21 having the short belt winding length generates excessive heat owing to the Joule heat generated thereby. However, when the contact width is set to satisfy Expression 3, the driven pulley 22 can be stably rotated by the rotation of the belt 23, and the voltage applied to the driving pulley 21 can be reduced. Further, since the voltage application unit 24 reduces the voltage applied to the driving pulley 21, excessive heat generation of the driving pulley 21 is suppressed.

It has been experimentally confirmed that, when a voltage of 450 V and a voltage of 400 V are applied to the driving pulley 21 and the driven pulley 22, respectively, an electrostatic attraction force (Johnsen-Rahbek force) of about 300 kPa and an electrostatic attraction force of about 170 kPa are generated per unit area on the driving pulley 21 and the driven pulley 22, respectively.

Figure 7:
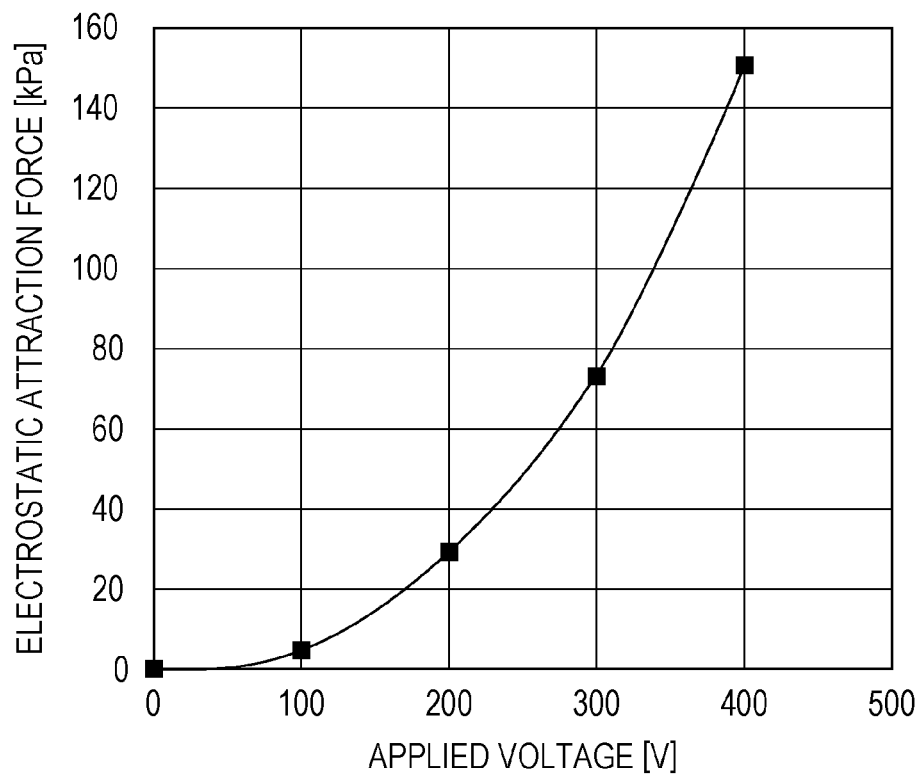
FIG. 7 shows the relationship between the voltage applied to a pulley and the Johnsen-Rahbek force.

FIG. 7 shows an example of an experiment that finds the relationship between the voltage applied to the pulley that is measured using a pulley and a belt actually produced and the Johnsen-Rahbek force. As shown in FIG. 7, it is experimentally confirmed that the Johnsen-Rahbek force increases as the voltage applied to the pulley increases.

In general, when power transmission is performed by the belt, the power is transmitted on the basis of the difference between the tensile force acting on the most upstream position of the pulley where the belt contacts with the pulley in the belt moving direction and the tensile force acting on the most downstream position of the pulley where the belt separates from the pulley in the belt moving direction. For this reason, the definition of the driving force corresponds to the difference between the belt tensile force acting on the most upstream position and the belt tensile force acting on the most downstream position. That is, the driving force to be transmitted is equal to this tensile force difference. The tensile force difference to be formed depends on the largest frictional force that can be generated between the pulley and the belt. In general, in the belt driving transmission that does not use electrostatic attraction force, a transmittable driving force $F_1$ is given by the following Expression 5 according to the Euler formula:

$$F_1 = \frac{e^{\mu\theta}-1}{e^{\mu\theta}+1}\left(\frac{T}{\sin\frac{\theta}{2}}\right) \qquad (5)$$

where T represents the tension that applies tensile force to the belt, $\theta$ represents the winding angle of the belt on the pulley, and $\mu$ represents the friction coefficient between the belt and the pulley.

Further, when P represents the electrostatic attraction force per unit area, r represents the radius of the pulley, and b represents the opposed width between the pulley electrode and the belt (hereinafter also referred to as electrode opposed width), a driving force $F_2$ that can be transmitted when the electrostatic attraction force P is applied is given by the following Expression 6:

$$F_2 = \frac{e^{\mu\theta}-1}{e^{\mu\theta}+1}\left(\frac{T}{\sin\frac{\theta}{2}} + 2 \cdot r \cdot b \cdot P\right) \qquad (6)$$

That is, an increase $\Delta F$ of the driving force that can be transmitted by the application of the electrostatic attraction force P is a difference between the driving force $F_2$ and the driving force $F_1$, and is given by the following Expression 7:

$$\Delta F = F_2 - F_1 = \frac{e^{\mu\theta} - 1}{e^{\mu\theta} + 1}(2 \cdot r \cdot b \cdot P) \quad (7)$$

The driving force $F_1$, the driving force $F_2$, and the increase $\Delta F$ of each of the driving pulley 21 and the driven pulley 22 can be calculated by substituting the pulley radius r, the electrode opposed width b, the friction coefficient μ, and the winding angle θ in Expressions 5 to 7.

As an example, the tension T applied to the belt 23 is 1 kgf. The driving force generated by this tension T is 0.3 kgf in the driving pulley 21 and 1.1 kgf in the driven pulley 22.

An electrostatic attraction force of 300 kPa per unit area is generated in the driving pulley 21, and a driving force generated by the electrostatic attraction force is 2.2 kgf. Further, an electrostatic attraction force of 170 kPa per unit area is generated in the driven pulley 22, and a driving force generated by the electrostatic attraction force is 1.4 kgf.

The sum of the driving force generated by the tension T and the driving force generated by the electrostatic attraction force is the transmittable driving force in each of the pulleys. The transmittable driving force of the driving pulley 21 is 0.3+2.2=2.5 kgf. The transmittable driving force of the driven pulley 22 is 1.1+1.4=2.5 kgf. Hence, the driving pulley 21 and the driven pulley 22 are substantially equal in transmittable driving force, and neither the driving pulley 21 nor the driven pulley 22 slips under a load of less than 2.5 kgf.

When the voltage application unit 24 applies a voltage of 850 V to the above-described series circuit, a current of about 0.12 mA flows through the driving pulley 21 and the driven pulley 22. At this time, the heating amount is found from the voltages applied to the pulleys 21 and 22 and the currents flowing therethrough. Since a voltage of 450 V is applied to the driving pulley 21, the heating amount is about 55 mW. Since a voltage of 400 V is applied to the driven pulley 22, the heating amount is about 45 mW. Therefore, the total heating amount of the driving transmission device 50 is about 100 mW.

For comparison, a description will now be given of the heating amount provided when the width of the metal portion 22a of the driven pulley 22 is equal to the width of 12 mm of the driving pulley 21. When the width of the metal portion 21a of the driving pulley 21 and the width of the metal portion 22a of the driven pulley 22 are equal, a voltage of about 1030 V and a voltage of about 175 V are applied to the driving pulley 21 and the driven pulley 22, respectively. At this time, the heating amount of the driving pulley 21 is about 270 mW and the heating amount of the driven pulley 22 is about 50 mW. Therefore, the total heating amount of the driving transmission device 50 is about 320 mW.

When the width of the metal portion 22a of the driven pulley 22 is 2 mm, the heating amount is lower than when the width of the metal portion 21a of the driving pulley 21 and the width of the metal portion 22a of the driven pulley 22 are equal to each other. The total heating amount of the driving transmission device 50 can be greatly reduced from about 320 mW to 100 mW. Thus, the heating-amount suppression effect is clear.

According to the first embodiment, the value obtained by multiplying the potential difference between the driven pulley 22 having a long winding length and the belt 23 by the winding length on the driven pulley 22 is set to be larger than the value obtained by multiplying the potential difference between the driving pulley 21 and the belt 23 by the belt winding length on the driving pulley 21. Thus, in the structure in which the pulleys are different in the belt winding length, the application of an excessive voltage to the driving pulley 21 and the driven pulley 22 is suppressed while ensuring the transmittable driving force. Further, since the voltage applied to the driving pulley 21 having a short winding length is lowered, the heating amount of the driving transmission device 50 is reduced.

In addition, the shape change and degradation of the belt 23 and the pulleys 21 and 22 and temperature rise in the apparatus due to excessive heat generation can be suppressed, and the change in the contact state due to the changes in the resistivity and shape resulting from heat generation can be suppressed. This stabilizes the electrostatic attraction force, and allows stable transmission of the driving force. This also contributes to reduction of power consumption.

In the first embodiment, the contact area per unit length between the driven pulley 22 and the belt 23 is made small to satisfy Expression 3. However, conversely, a similar heating-amount suppression effect can also be obtained by increasing the contact area per unit length between the driving pulley 21 and the belt 23. For example, the width of the metal portion 21a of the driving pulley 21 may be increased instead of decreasing the width of the metal portion 22a of the driven pulley 22.

While the dielectric layers are provided on the pulleys 21 and 22 in the above-described structure, a dielectric layer may be provided on the contact face of the belt 23 in contact with the pulleys 21 and 22. Alternatively, dielectric layers may be provided on both the outer peripheral surfaces of the pulleys 21 and 22 and the inner peripheral surface of the belt 23. It is only necessary that the dielectric layer is interposed between the conductive portion (for example, the metal layer) of the belt 23 and the conductive portions (metal layers) of the pulleys 21 and 22 in the areas where the belt 23 is wound around the pulleys 22 and 23. When three or more pulleys are provided, a structure in which the pulleys are disposed on the outer side of the annular shape of the belt 23 is conceivable. In this structure, a dielectric layer is provided on the outer side of the annular shape of the belt 23.

The belt 23, the driving pulley 21, and the driven pulley 22 each may have a non-conductive portion (for example, a resin portion) as long as electric connection is not hindered.

While the driven pulley 22 is grounded in the first embodiment, voltage may be applied to the driven pulley 22 and the driving pulley 21 may be grounded.

The method of changing the contact area between the belt 23 and each pulley per unit belt winding length is not limited to the method of changing the electrode width (for example, the width of the metal portion 22a) of the pulley. As another method, the width of the dielectric layer of the pulley (the width of the dielectric layer 22d) can be decreased. Alternatively, the opposed area can be changed by forming various patterns, such as a zigzag pattern, on the contact surface. For example, as in a modification illustrated in FIG. 8, the pulley may be shaped like a crown to form a height difference in the contact surface.

Figure 8:
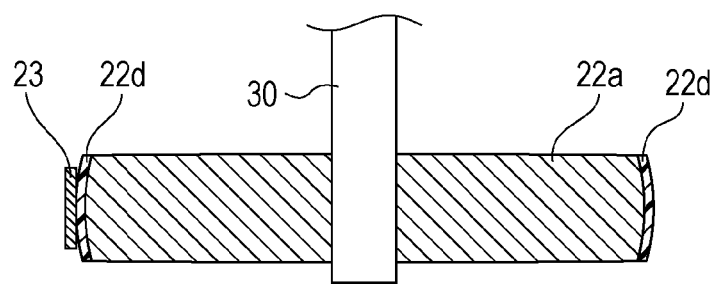
FIG. 8 is a cross-sectional view of a driven pulley according to a modification.

FIG. 8 is a cross-sectional view of a driven pulley 22 in the modification. In the driven pulley 22, both a metal portion 22a and a dielectric layer 22d are convexly curved in the width-wise direction. That is, an outer peripheral portion of the driven pulley 22 is rounded in a cross section parallel to a support shaft of the driven pulley 22. This reduces the substantial contact area where the metal portion 22a functioning as an electrode is opposed to a belt 23.

Alternatively, a comb-shaped metal portion may be used. Further alternatively, the contact area can be reduced by roughening the outer peripheral surface of the pulley in contact with the belt 23. Conceivable methods for changing the surface roughness of the pulley in contact with the belt 23 are a method of cutting the surface with a lathe, lapping polishing for polishing the surface with an abrasive in which loose abrasive grains are dispersed, and sandblasting for blasting an abrasive.

When the dielectric layer is provided on the contact surface between the belt 23 and the pulley, the following method is adopted. That is, the shapes of the electrodes (metal portions) of the driving pulley 21 and the driven pulley 22 are changed so that the contact area between the driving pulley 21 and the belt 23 is smaller than the contact area between the driven pulley 22 and the belt 23.

Second Embodiment

In the first embodiment, the contact resistance ($R_{S1}$ or $R_{S2}$) of the electric resistance values between the pulley and the belt is changed. In a second embodiment of the present invention, a bulk resistance is changed.

In the second embodiment, the volume resistivity is changed to satisfy Expression 3.

First, a description will be given of a method in which an advantage similar to that of the method of changing the width of a metal portion 22a of a driven pulley 22 is obtained by changing the volume resistivity of a dielectric layer 22d of the driven pulley 22.

For example, the electrode width of the driven pulley 22 (width of the metal portion 22a) is 10 mm. An opposed width b between the metal portion 22a of the driven pulley 22 and the belt 23 is equal to the opposed width between a metal portion 21a of a driving pulley 21 and the belt 23. That is, the opposed width b is 10 mm. Further, the volume resistivity of the dielectric layer 22d is changed from $1\times10^{11}$ Ω·cm in the first embodiment to $1.8\times10^{11}$ Ω·cm. Other structures are similar to those adopted in the first embodiment. When a voltage of about 700 V is applied from a voltage application unit 24 in this structure, a voltage $V_1$ of about 500 V and a voltage $V_2$ of about 200 V are applied to the driving pulley 21 and the driven pulley 22, respectively.

That is, to satisfy Expression 3, the ratio of voltages applied to the driving pulley 21 and the driven pulley 22 is changed by making the volume resistivity of the dielectric layer 22d higher than the volume resistivity of the dielectric layer 21d.

When the voltage of 500 V is applied to the driving pulley 21, the driving force generated by the electrostatic attraction force is 2.2 kgf. When this driving force and a driving force of 0.3 kgf generated by a tension T for applying tensile force to the belt 23 are added, the transmittable driving force is 2.5 kgf. In contrast, when the voltage of 200 V is applied to the driven pulley 22, a driving force generated by the electrostatic attraction force is 1.4 kgf. When this driving force and a driving force of 1.1 kgf generated by a tension T for applying tensile force to the belt 23 are added, the transmittable driving force is 2.5 kgf. Hence, in this structure, a slip does not occur under a load of 2.5 kgf or less.

When the voltage of 700 V is applied from the voltage application unit 24, a current of about 0.12 mA flows through the driving pulley 21 and the driven pulley 22. Thus, the heating amounts of the driving pulley 21 and the driven pulley 22 are about 60 mW and about 20 mW, respectively. Thus, the total heating amount of the driving transmission device 50 is about 80 mW.

For comparison, a description will be given of a case in which the volume resistivity of the dielectric layer 22d and the volume resistivity of the dielectric layer 21d are made equal to each other without reflecting the devices of the present invention. Both the electrode opposed widths b between the driving pulley 21 and the driven pulley 22 and the belt 23 are 10 mm. In this case, the driving pulley 21 requires a voltage of about 1030 V and the driven pulley 22 requires a voltage of about 175 V so that the transmittable driving force becomes 2.5 kgf. Then, Expression 3 is not satisfied, but Expression 4 is satisfied. In this structure, the heating amounts of the driving pulley 21 and the driven pulley 22 are about 270 mW and about 50 mW, respectively, and the total heating amount of the driving transmission device 50 is about 320 mW.

In this way, in the second embodiment, since the volume resistivity of the dielectric layer 22d is $1.8\times10^{11}$ Ω·cm, the total heating amount can be greatly reduced from about 320 mW to 80 mW. Thus, the heating-amount suppression effect is clear.

According to the second embodiment, in the structure in which the belt winding length is different between the pulleys, an excessive voltage is restricted from being applied to the driving pulley and the driven pulley while ensuring the transmittable driving force. Further, since the voltage applied to the driving pulley 21 having the short winding length is lowered, the heating amount of the driving transmission device 50 is reduced. Still further, the shape change and degradation of the belt 23 and the pulleys 21 and 22 and temperature rise in the apparatus due to excessive heat generation can be suppressed, and the change in the contact state due to the changes in the resistivity and shape resulting from heat generation can be suppressed. This stabilizes the electrostatic attraction force, and allows stable transmission of the driving force. This also contributes to reduction of power consumption.

Third Embodiment

Figure 9:
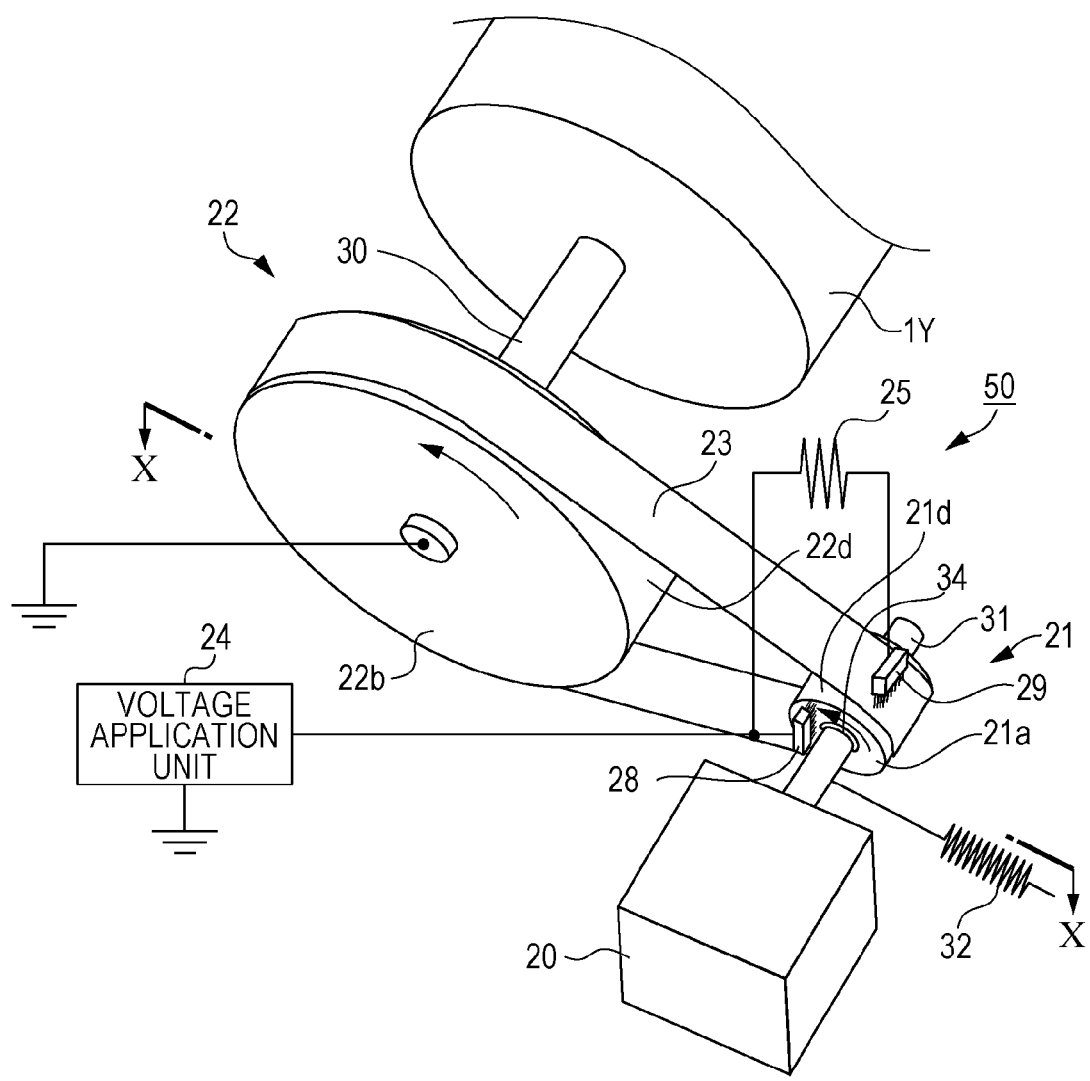
FIG. 9 is a perspective view of a driving transmission device according to a third embodiment.
Figure 10:
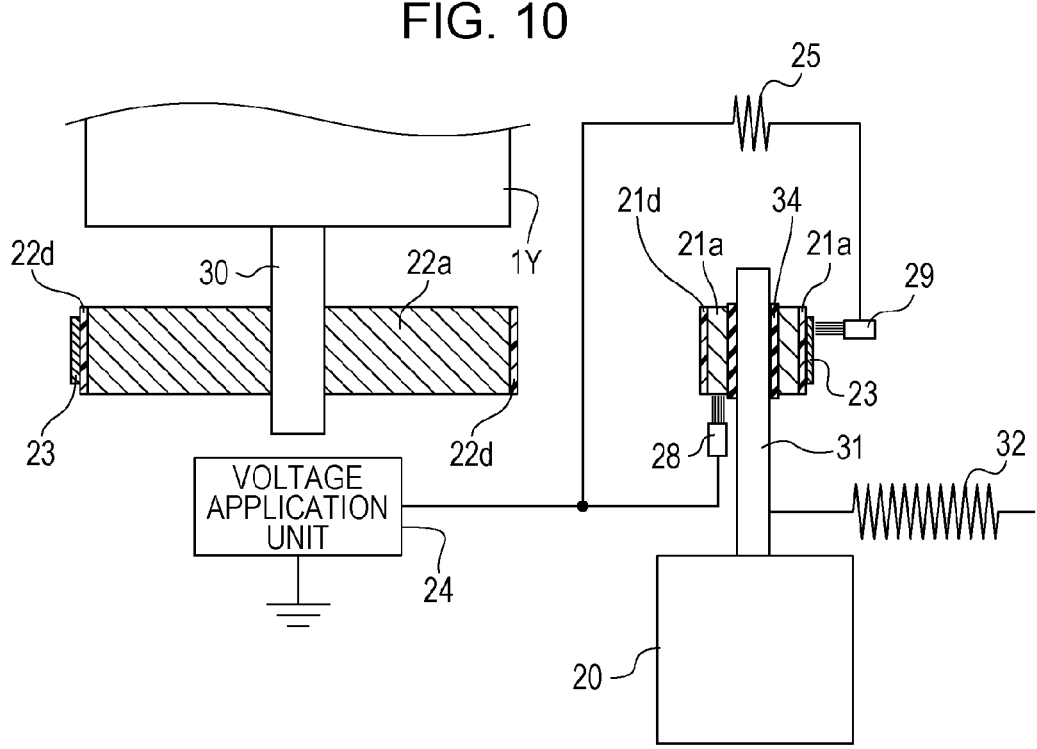
FIG. 10 is a cross-sectional view taken along line X-X of FIG. 9.
Figure 11:
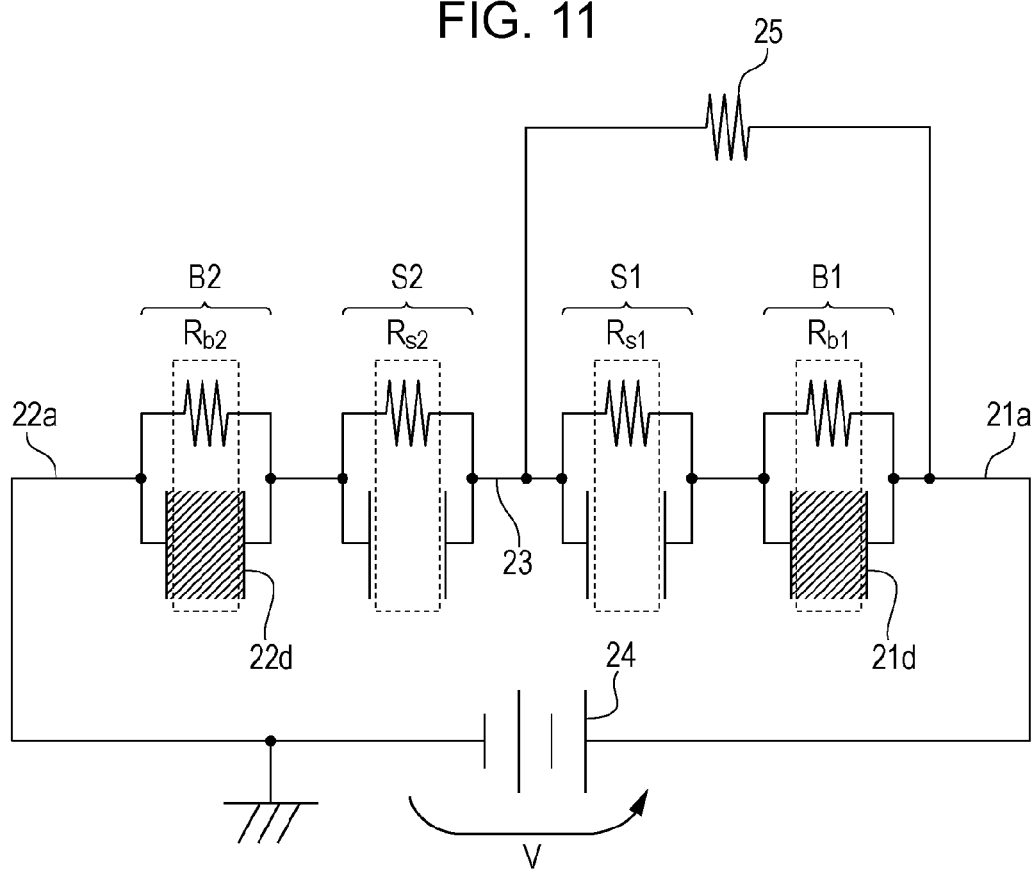
FIG. 11 illustrates an equivalent circuit showing electric properties of the driving transmission device.

FIG. 9 is a perspective view of a driving transmission device according to a third embodiment of the present invention. FIG. 10 is a cross-sectional view taken along line X-X of FIG. 9. FIG. 11 illustrates an equivalent circuit showing electric properties of a driving transmission device 50.

In the third embodiment, a parallel resistor 25 serving as a resistor element connected to a driving pulley 21 in parallel is added to the series circuit of the first embodiment. Further, the structure of a driven pulley 22 is different from that in the first embodiment. Other structures are equal to those in the first embodiment.

As illustrated in FIG. 10, the driven pulley 22 has a cylindrical metal portion 22a. A dielectric layer 22d is provided on a side (outer peripheral surface) of the metal portion 22a in contact with a belt 23. Two resin portions 22b and 22c are not provided, and the width of the metal portion 22a is about 12 mm. A radius $r_2$ and width of the driven pulley 22 and the volume resistivity of the dielectric layer 22d are the same as those in the first embodiment. The driving pulley 21, the belt 23, and winding angles $\theta_1$ and $\theta_2$ are the same as those in the first embodiment.

The resistance value of the parallel resistor 25 is about 3.3 MΩ. As illustrated in FIGS. 9 and 10, the parallel resistor 25 is connected at one end to a metal portion 21a of the driving pulley 21 via a conductive brush 28, and is connected at the other end to the belt 23 via a conductive brush 29.

In the third embodiment, part of power is consumed by the parallel resistor 25 to reduce the heating amounts of the driving pulley 21 and the driven pulley 22. Although the parallel resistor 25 generates heat, it is disposed apart from the belt 23 and the pulleys 21 and 22 so as not to have a great influence on the shapes thereof, the temperature rise in the apparatus, the material properties, and so on.

As an example, a description will be given of a case in which the driving transmission device 50 requires a transmittable driving force of 2.5 kgf.

By disposing the parallel resistor 25 in parallel with the driving pulley 21, the voltage applied to the driving pulley 21 is reduced. As illustrated in FIG. 11, the parallel resistor 25 is connected in parallel with a contact resistor $R_{S1}$ in a contact portion S1 and a bulk resistor $R_{b1}$ in a dielectric bulk portion B1 between the driving pulley 21 and the belt 23 connected in series. The parallel resistor 25 reduces the electric resistance between the metal portion 21a of the driving pulley 21 and the belt 23, and reduces the voltage applied to the driving pulley 21.

The combined resistance of the contact resistance $R_{S1}$ and the bulk resistance $R_{b1}$ is about 1.8 MΩ, and the combined resistance of the contact resistance $R_{S2}$ and the bulk resistance $R_{b2}$ is about 0.65 MΩ. When a voltage V of 650 V is applied from a voltage application unit 24 in a state in which the parallel resistor 25 of about 3.3 MΩ is connected to the metal portion 21a of the driving pulley 21 and the belt 23, a voltage of 450 V and a voltage of 200 V are applied to the driving pulley 21 and the driven pulley 22, respectively.

By thus providing the parallel resistor 25, the ratio of the voltages applied to the driving pulley 21 and the driven pulley 22 is changed to satisfy Expression 3.

When the voltage of 450 V and the voltage of 200 V are applied to the driving pulley 21 and the driven pulley 22, respectively, electrostatic attraction forces (Johnsen-Rahbek forces) of about 300 kPa and about 35 kPa per unit area are generated in the driving pulley 21 and the driven pulley 22, respectively. In this case, the driving force generated by the electrostatic attraction force in the driving pulley 21 is 2.2 kgf. The driving force generated by the electrostatic attraction force in the driven pulley 22 is 1.4 kgf.

As described in conjunction with the first embodiment, the driving force generated by the tension T to the belt 23 is 0.3 kgf in the driving pulley 21 and 1.1 kgf in the driven pulley 22. Therefore, the transmittable driving force in the driving pulley 21 is 0.3+2.2=2.5 kgf, and the transmittable driving force in the driven pulley 22 is 1.1+1.4=2.5 kgf. Hence, the transmittable driving force is substantially equal between the driving pulley 21 and the driven pulley 22, and a slip does not occur under a load of 2.5 kgf or less.

As for the current, a current of about 0.12 mA and a current of about 0.24 mA flow through the driving pulley 21 and the driven pulley 22, respectively. The heating amount is determined by the voltage applied to each of the pulleys 21 and 22 and the current flowing therethrough. Hence, the heating amounts of the driving pulley 21 and the driven pulley 22 are about 60 mW and about 50 mW, respectively, and the total heating amount of the driving transmission device 50 is about 110 mW.

For comparison, a description will be given of a case in which the parallel resistor 25 is not provided without applying the devices of the present invention. To obtain a transmittable driving force of 2.5 kgf in this case, the driving pulley 21 requires a voltage of about 1030 V and the driven pulley 22 requires a voltage of about 175 V. Then, Expression 3 is not satisfied, but Expression 4 is satisfied. In this structure, the heating amounts of the driving pulley 21 and the driven pulley 22 are about 270 mW and about 50 mW, respectively, and the total heating amount of the driving transmission device 50 is about 320 mW.

In this way, since the parallel resistor 25 is provided in the third embodiment, the total heating amount can be greatly reduced from about 320 mW to about 110 mW. Thus, the heating-amount suppression effect is clear.

According to the third embodiment, even when the pulleys are different in the belt winding length, heat generation between the pulleys and the belt can be suppressed while reducing vibration and noise and preventing a slip between the pulleys and the belt, similarly to the first embodiment.

In particular, the heating amount of the driving pulley 21 can be reduced only by connecting the parallel resistor 25 to the dielectric layer 21d of the driving pulley 21 in parallel. For this reason, unlike the driven pulley 22 in the first embodiment, there is no need to provide resin portions 22b and 22c, and this simplifies the structure of the driven pulley 22. Further, the driving pulley 21 and the driven pulley 22 can adopt dielectric layers of the same specification.

In the first to third embodiments, other various structures can be applied to the combination of the driving pulley 21 and the driven pulley 22. For example, in the first to third embodiments, the belt winding length is longer in the driven pulley 22 than in the driving pulley 21. In the opposite case, the device may be adopted on the opposite side. In this case, the values to be substituted for $L_2$, $V_2$, $L_1$, and $V_1$ in Expression 3 are opposite between the driving pulley 21 and the driven pulley 22.

For example, when the belt winding length of the driving pulley 21 is longer, it is only necessary to decrease the width of the metal portion 21a or to increase the volume resistivity or the film thickness t of the dielectric layer 21d so as to increase the contact resistance $R_{S1}$ and the bulk resistance $R_{b1}$ between the metal portion 21a of the driving pulley 21 and the belt 23. Alternatively, a resistor corresponding to the parallel resistor 25 may be provided in parallel with the driven pulley 22.

As such a structure in which the belt winding length is longer in the driving pulley than in the driven pulley, an acceleration system in which the radius of the driving pulley is longer than the radius of the driven pulley and a system in which the belt winding length is changed by adding a tension roller or a tension member are conceivable.

Fourth Embodiment

While one driven pulley is provided in the first to third embodiments, two or more driven pulleys may be provided. In a fourth embodiment of the present invention, two driven pulleys are adopted.

Figure 12:
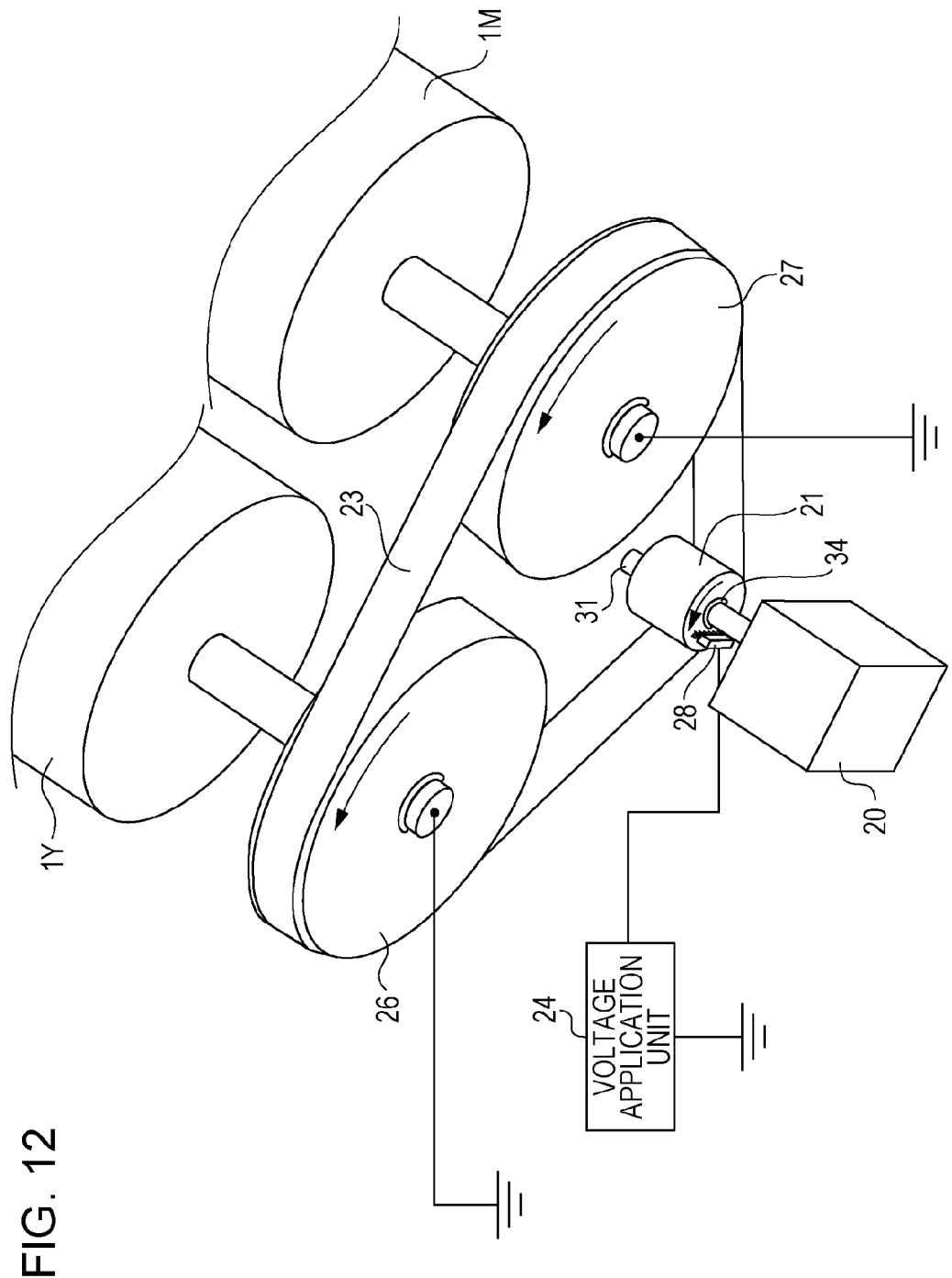
FIG. 12 is a perspective view of a driving transmission device according to a fourth embodiment.
Figure 13:
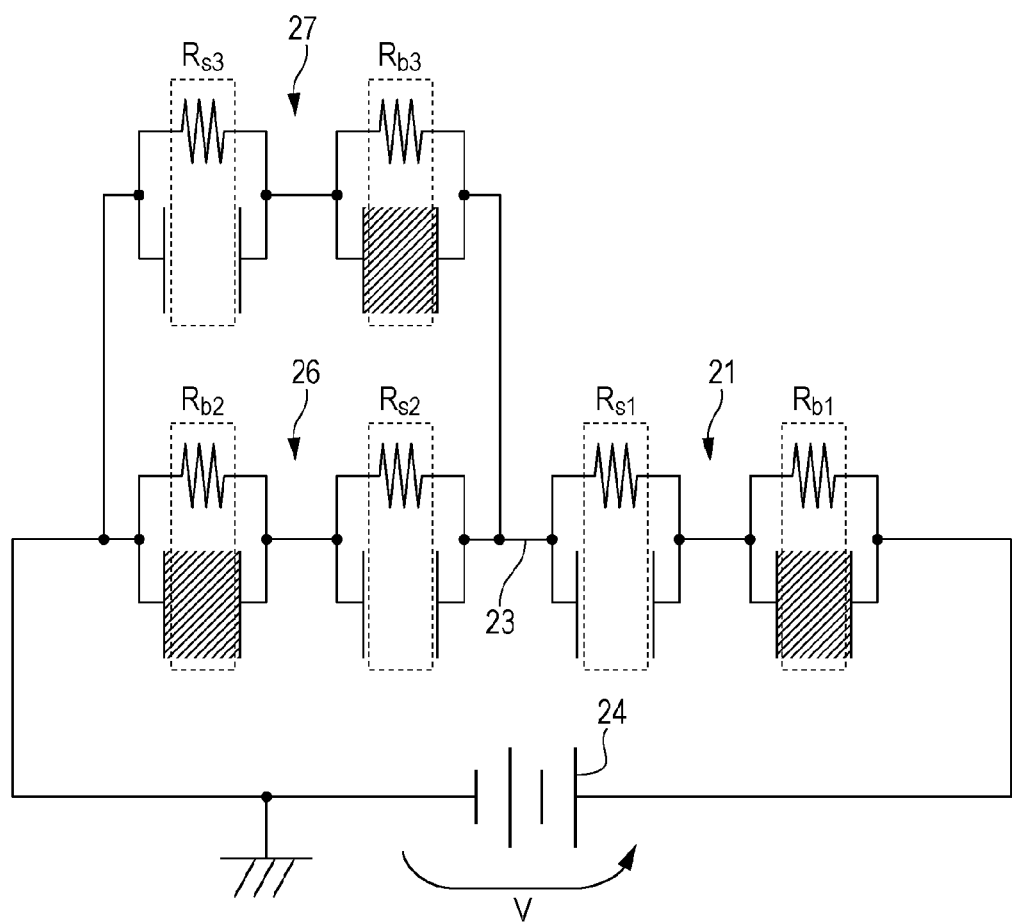
FIG. 13 illustrates an equivalent circuit showing electric properties of the driving transmission device.

FIG. 12 is a perspective view of a driving transmission device according to a fourth embodiment. FIG. 13 illustrates an equivalent circuit showing electric properties of a driving transmission device 50. The fourth embodiment illustrated in FIGS. 12 and 13 is based on the structure of the first embodiment, and is developed into a structure in which two driven pulleys are driven by one driving pulley 21. The number of driven pulleys may be three or more, and a belt may be stretched on the driving pulley and the driven pulleys by any method.

As illustrated in FIG. 12, a driving pulley 21, a first driven pulley 26, and a second driven pulley 27 are provided, and one belt 23 is wound on the pulleys. The structures of the belt 23 and the driving pulley 21 are similar to those adopted in the first embodiment. Metal portions of the first driven pulley 26 and the second driven pulley 27 both have a width of about 1 mm, and are connected to photoconductive drums 1Y and 1M, respectively.

That is, the width of the metal portions of the driven pulleys 26 and 27 is smaller than the width of 2 mm of the metal portion 22a of the driven pulley 22 (FIG. 3) in the first embodiment. Instead, the width of resin portions corresponding to the two resin portions 22b and 22c is larger, and the total width of the driven pulleys 26 and 27 is equal to that of the driven pulley 22. The structure and shape of dielectric layers of the driven pulleys 26 and 27 are the same as those of the dielectric layer 22d of the driven pulley 22. The driven pulleys 26 and 27 have the same structure and the same belt winding length. Other structures are similar to those of the driven pulley 22 in the first embodiment.

When the driving pulley 21 is rotated by a motor 20, driving force is transmitted to the first driven pulley 26 and the second driven pulley 27 via the belt 23, and the photoconductive drums 1Y and 1M rotate.

In an equivalent circuit illustrated in FIG. 13, the metal portion and the dielectric layer of the first driven pulley 26 and the metal portion and the dielectric layer of the second driven pulley 27 are connected in parallel. By making the widths of the metal portions of the first driven pulley 26 and the second driven pulley 27 smaller than the width of the metal portion 22a of the driving pulley 21, the transmittable driving force is made equal among the pulleys 21, 26, and 27 so as to reduce the heating amount of the driving transmission device 50.

According to the fourth embodiment, even when a plurality of driven pulleys are provided, similarly to the first embodiment, heat generation between the pulleys and the belt can be suppressed while reducing vibration and noise and preventing a slip between the pulleys and the belt.

The structure in which a plurality of driven pulleys are provided is also applicable to the second and third embodiments. In any case, when the resistances of the first driven pulley 26 and the second driven pulley 27 are considered to satisfy Expression 3, a combined resistance obtained by parallel connection of the pulleys may be applied.

That is, as illustrated in FIG. 13, a resistance $(R_{S2}+R_{b2})$ is considered between the first driven pulley 26 and the belt 23, and a resistance $(R_{S3}+R_{b3})$ is considered between the second driven pulley 27 and the belt 23. A combined resistance of the resistance $(R_{S2}+R_{b2})$ and the resistance $(R_{S3}+R_{b3})$ connected in parallel can be regarded as a resistance of the driven pulleys.

In the above-described embodiments, it is preferable, to satisfy Expression 3, that the transmittable driving forces of the driving pulley 21 and the driven pulley 22 should be equal to each other. However, even when the transmittable driving forces are not equal, as long as they are as close as possible and Expression 3 is satisfied, the heat generation suppressing effect can be obtained accordingly.

In the above-described embodiments, a plurality of pairs of the driven portion and the driving source to which the rotation force is to be transmitted in the driving transmission device 50 may be provided, and the present invention is applicable to each of the pairs. The connection of the driven portion and the driven pulley and the connection of the driving source and the driving pulley may be made not directly, but indirectly.

The present invention is applicable not only to the image forming apparatus, but also to a sheet processing apparatus and other various apparatuses. The image forming apparatus to which the present invention is applied is not limited to the electrophotographic image forming apparatus, and may be applied to image forming apparatuses using other methods such as a heat transfer method and an inkjet method. For example, in the inkjet method, a carriage belt for driving a carriage can serve as a driven portion. In the heat transfer method, a platen roller can serve as a driven portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-068639, filed Mar. 28, 2014, which is hereby incorporated by reference herein in its entirety.

What is claimed is:

1. A driving transmission device comprising:
   a motor;
   a first pulley to be rotated by the motor;
   a second pulley connected to a rotating member;
   an endless belt wound on the first pulley and the second pulley;
   a dielectric layer provided between the endless belt and the first pulley and between the endless belt and the second pulley; and
   a power supply unit configured to apply a voltage to the first pulley,
   wherein the first pulley, the endless belt, and the second pulley are connected in series,
   wherein a length by which the endless belt is wound on the second pulley is larger than a length by which the endless belt is wound on the first pulley, and
   wherein a voltage applied to the second pulley is lower than the voltage applied to the first pulley.

2. The driving transmission device according to claim 1,
   wherein the dielectric layer includes a first dielectric layer and a second dielectric layer,
   wherein the first pulley includes a first metal portion to which the voltage is applied from the power supply unit and the first dielectric layer,
   wherein the second pulley includes a second metal portion and the second dielectric layer, and
   wherein a volume resistivity of the second dielectric layer is higher than a volume resistivity of the first dielectric layer.

3. The driving transmission device according to claim 1,
   wherein the dielectric layer includes a first dielectric layer and a second dielectric layer,
   wherein the first pulley includes a first metal plate to which the voltage is applied from the power supply unit and the first dielectric layer,
   wherein the second pulley includes a second metal plate and the second dielectric layer, and
   wherein a thickness of the first metal plate is smaller than a thickness of the second metal plate.

4. The driving transmission device according to claim 1,
   wherein the dielectric layer includes a first dielectric layer and a second dielectric layer,
   wherein the first pulley includes a first metal portion to which the voltage is applied from the power supply unit and the first dielectric layer,
   wherein the second pulley includes a second metal portion and the second dielectric layer, and
   wherein a thickness of the second dielectric layer between the second metal portion and the endless belt is smaller than a thickness of the first dielectric layer between the first metal portion and the endless belt.

5. The driving transmission device according to claim 1, further comprising:
   a resistor element connected to the first pulley and the endless belt in parallel.

6. The driving transmission device according to claim 1, wherein the dielectric layer includes a dielectric layer provided on an inner peripheral surface of the endless belt.

7. The driving transmission device according to claim 1, wherein a radius of the second pulley is larger than a radius of the first pulley.

8. An image forming apparatus comprising:
an image bearing member to be rotated;
an image forming unit configured to form an image on the image bearing member; and
the driving transmission device according to claim 1,
wherein the rotating member corresponds to the image bearing member.

9. The image forming apparatus according to claim 8, wherein the image bearing member is a photoconductor.

10. A driving transmission device comprising:
a motor;
a first pulley to be rotated by the motor;
a second pulley connected to a rotating member;
an endless belt wound on the first pulley and the second pulley;
a dielectric layer provided between the endless belt and the first pulley and between the endless belt and the second pulley; and
a power supply unit configured to apply a voltage to the second pulley,
wherein the first pulley, the endless belt, and the second pulley are connected in series,
wherein a length by which the endless belt is wound on the second pulley is larger than a length by which the endless belt is wound on the first pulley, and
wherein the voltage applied to the second pulley is lower than a voltage applied to the first pulley.

11. The driving transmission device according to claim 10,
wherein the dielectric layer includes a first dielectric layer and a second dielectric layer,
wherein the first pulley includes a first metal portion and the first dielectric layer,
wherein the second pulley includes a second metal portion to which the voltage is supplied from the power supply unit and the second dielectric layer, and
wherein a volume resistivity of the second dielectric layer is higher than a volume resistivity of the first dielectric layer.

12. The driving transmission device according to claim 10,
wherein the dielectric layer includes a first dielectric layer and a second dielectric layer,
wherein the first pulley includes a first metal plate and the first dielectric layer,
wherein the second pulley includes a second metal plate to which the voltage is supplied from the power supply unit and the second dielectric layer, and
wherein a thickness of the first metal plate is smaller than a thickness of the second metal plate.

13. The driving transmission device according to claim 10,
wherein the dielectric layer includes a first dielectric layer and a second dielectric layer,
wherein the first pulley includes a first metal portion and the first dielectric layer,
wherein the second pulley includes a second metal portion to which the voltage is supplied from the power supply unit and the second dielectric layer, and
wherein a thickness of the second dielectric layer between the second metal portion and the endless belt is smaller than a thickness of the first dielectric layer between the first metal portion and the endless belt.

14. The driving transmission device according to claim 10, further comprising:
a resistor element connected to the first pulley and the endless belt in parallel.

15. The driving transmission device according to claim 10, wherein the dielectric layer includes a dielectric layer provided on an inner peripheral surface of the endless belt.

16. The driving transmission device according to claim 10, wherein a radius of the second pulley is larger than a radius of the first pulley.

17. An image forming apparatus comprising:
an image bearing member to be rotated;
an image forming unit configured to form an image on the image bearing member; and
the driving transmission device according to claim 10,
wherein the rotating member corresponds to the image bearing member.

18. The image forming apparatus according to claim 17, wherein the image bearing member is a photoconductor.

* * * * *